United States Patent [19]

Zirps

[11] Patent Number: 4,921,007
[45] Date of Patent: May 1, 1990

[54] MASTER BRAKE CYLINDER SUCTION REFILL VALVE

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 382,047

[22] Filed: Jul. 18, 1989

Related U.S. Application Data

[63] Continuation of Ser. No. 182,011, Apr. 15, 1988, abandoned.

[30] Foreign Application Priority Data

May 21, 1987 [DE] Fed. Rep. of Germany ....... 3717088

[51] Int. Cl.⁵ .......................... F16K 15/00; B60T 11/20
[52] U.S. Cl. .................................. 137/543.21; 60/562; 60/592; 251/323
[58] Field of Search ................. 60/562, 585, 588, 592; 251/323, 358; 137/526, 543.21

[56] References Cited

U.S. PATENT DOCUMENTS

| | | | |
|---|---|---|---|
| 3,885,391 | 3/1975 | Campbell | 60/581 |
| 3,889,469 | 6/1975 | Cryder et al. | 60/562 |
| 4,099,380 | 7/1978 | Cadeddu | 60/592 X |
| 4,621,498 | 11/1986 | Schaefer | 60/562 |
| 4,649,707 | 3/1987 | Belart | 60/562 X |
| 4,707,989 | 11/1987 | Nakamura et al. | 60/562 X |

*Primary Examiner*—Edward K. Look
*Attorney, Agent, or Firm*—Edwin E. Greigg

[57] ABSTRACT

A suction refill valve for a master brake cylinder which is suitable for use in brake systems having brake slip control. The refill valve has a sealing element, made from an elastic material, which is annular and is acted upon on virtually all sides by the pressure arising in the work chamber of the brake cylinder. In combination with a valve opening embodied as an annular gap, the suction refill valve can open at relatively low force, even when the brake pressure is high.

14 Claims, 3 Drawing Sheets

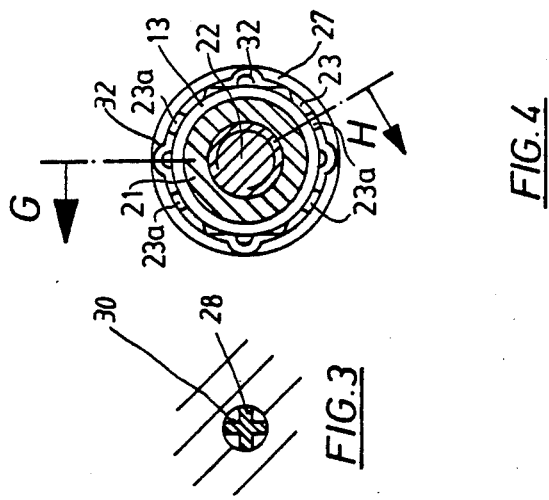
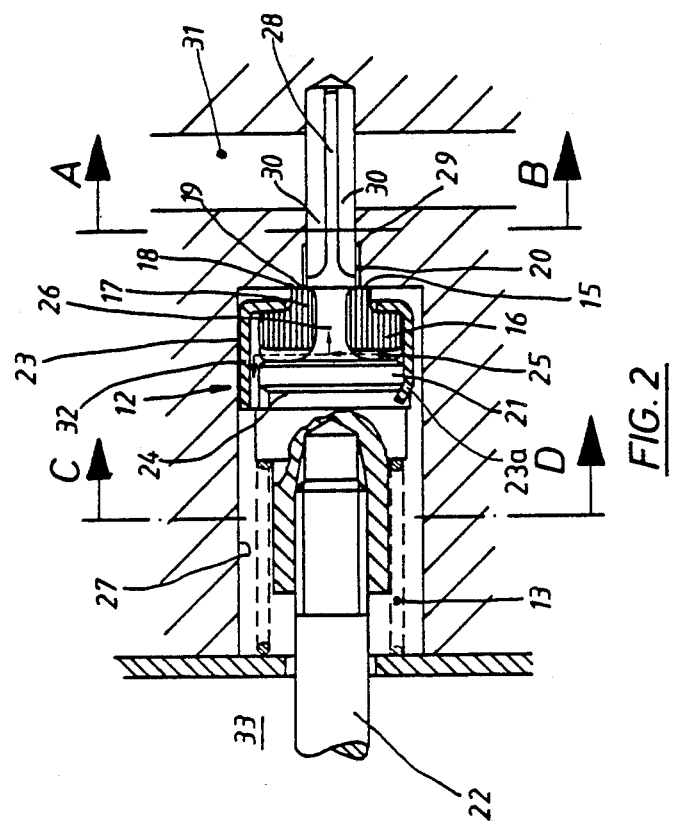

MASTER BRAKE CYLINDER SUCTION REFILL VALVE

This is a continuation of copending application Ser. No. 182,011, filed Apr. 15, 1988, now abandoned.

BACKGROUND OF THE INVENTION

The invention relates to a suction refill valve for a master brake cylinder. Suction refill valves are used in the master brake cylinder for filling brake systems, for instance in motor vehicles. In the aspiration position of the brake pedal, in the pressureless state, an exchange of fluid between the supply container and the brake system takes place and thus assures a uniform brake system fill level. In brake systems having brake slip control, the volumes of fluid in the static brake systems are varied, producing considerable differences in pressure when these refill valves are opened. The suction refill valves are also part of the brake slip control. For this application, not only must the suction refill valves be pressure tight, but they must also be capable of being opened and closed at high pressure without being damaged. Since they are opened by spring force, the opening force must also be as low as possible.

OBJECT AND SUMMARY OF THE INVENTION

The suction refill valve has the advantage that because pressure is exerted on the sealing element from virtually all sides, only a slight force is needed to open and close the valve. It can thus be closed with spring force, in particular, and can be used in brake systems having brake slip control. With the suction refill valve embodied in accordance with the invention, the effect of the pressure between the work chamber and the valve opening is reduced to a relatively small region of the valve opening. As a result, not only is the force necessary for opening the valve kept low, even at high pressures, but deformation of the sealing element is reduced to a minimum.

To assure that the pressure acts as much as possible on all sides of the sealing element of the suction refill valve, recesses that connect the annular opening of the annular sealing element with the brake piston work chamber may be provided on the sealing element and/or the adjoining valve body. The sealing element may be secured on the valve body by means of a cap that encompasses the sealing element, with a tubular extension on the sealing element acting as the sealing face. It is particularly advantageous here to embody the valve opening as an annular gap extending in the center of the annular sealing face.

The valve body may be guided in a bore by means of guide lugs embodied on the cap, which permit a flow of brake fluid on virtually all sides of the valve body or sealing element. This reduces the effective pressure between the installation space, embodied by the bore, and the annular gap in the desired manner.

The invention will be better understood and further objects and advantages thereof will become more apparent from the ensuing detailed description of a preferred embodiment taken in conjunction with the drawings.

BRIEF DESCRIPTION OF THE DRAWING

FIG. 2 shows a section of the suction refill valve on a larger scale taken along line G-H of FIG. 4;

FIG. 3 is a sectional view, taken along the line A-B of FIG. 2, through a pin that is pressed into the region of the valve opening in FIG. 2; and FIG. 4 is a sectional view, taken along the line C-D of FIG. 2, through the suction refill valve of FIG. 2.

FIGS/ 5(a) and 5(b) illustrate different, enlarged views of a sealing element.

DESCRIPTION OF THE PREFERRED EMBODIMENT

Figure 1:
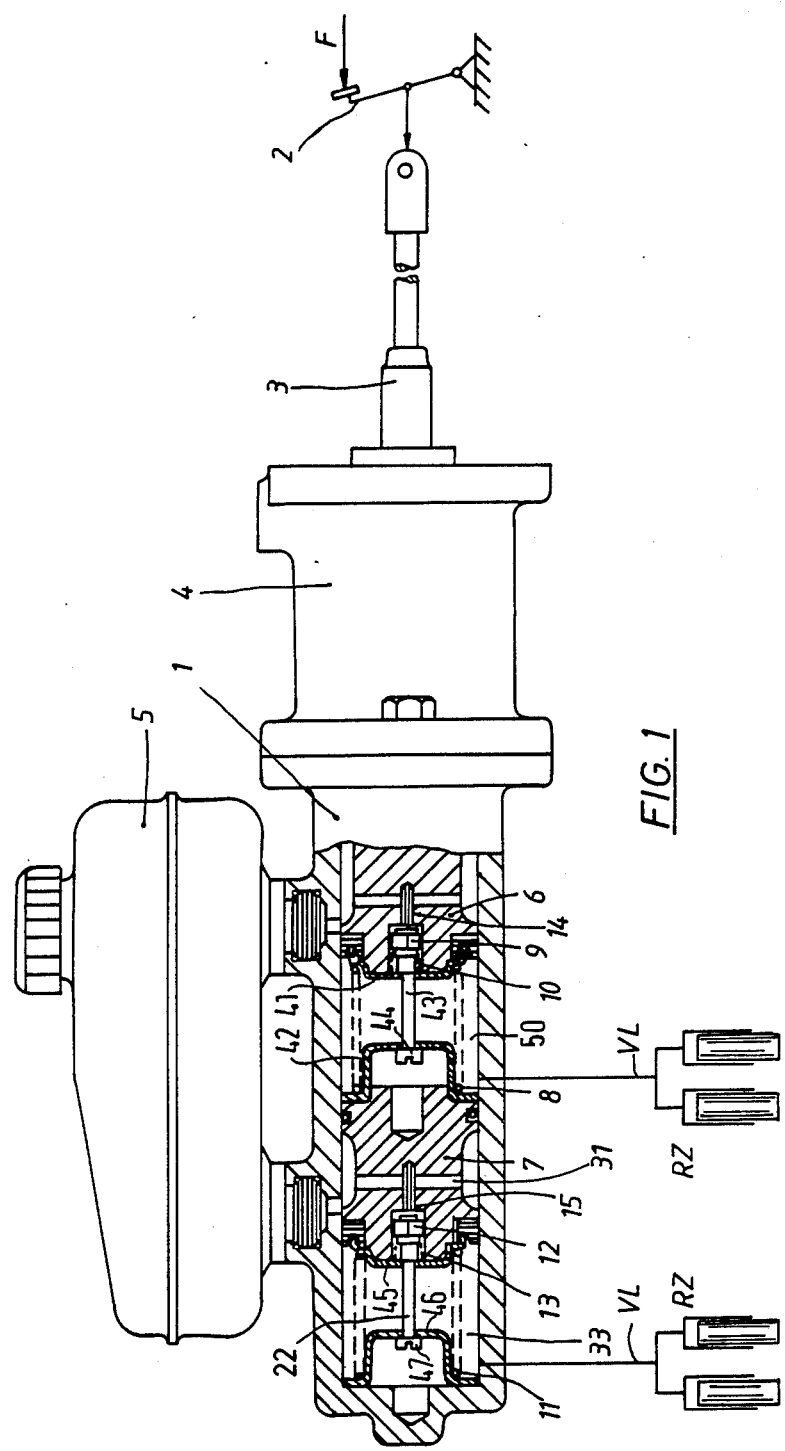
FIG. 1 shows a brake cylinder having two suction refill valves.
Figure 5A:
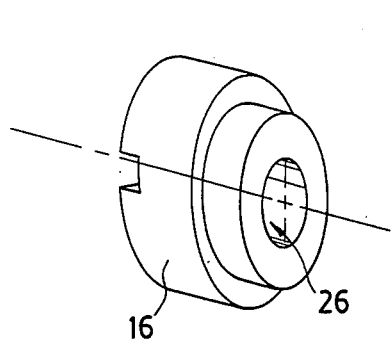
Figure 5B:
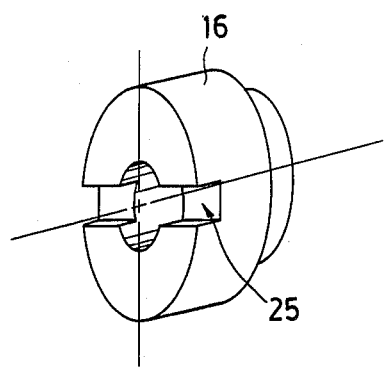

The brake cylinder 1 shown in FIG. 1 is actuated via a foot pedal 2, a pressure bar 3 and a brake booster 4. A container 5, which serves as a supply container for the brake fluid, is mounted on the brake cylinder 1. Located in the brake cylinder 1 are two brake pistons 6, 7, of which the brake piston 6 is actuated via the brake booster 4, while the brake piston 7 is a floating piston. In the position shown, the brake piston 6 is in its outset position on the right, and by the action of a spring 8 in a work chamber 50 which is seated on its ends against brackets 41, 42, a suction refill valve 9 disposed in the brake piston 6 is retained in the open position, counter to the force of a spring 10. The valve 9 includes a valve stem 43 that extends through bracket 41 and 42 and is secured to the bracket 42 at its opposite end by head 44 so that the valve 9 is supported by bracket 42.

The floating brake piston 7 is positioned between the spring 8 and a further spring 11 in work chamber 33. Once again, a suction refill valve 12 disposed in the brake piston 7 is kept open by the force of the spring 11, counter to a spring 13 since the valve stem 22 of valve 12 is secured to bracket 46 by head 47. The brackets 45 and 46 support the ends of spring 11.

If the force F of a foot acting upon the pedal 2 pushes the pressure bar 3 to the left in the housing of the brake booster 4, then the brake piston 6 likewise executes a movement in the same direction. As a result, the spring 8 and the spring 11 as well are compressed via the brake piston 7. The springs 10, 13 engaging the refill valves 9, 12 can thus relax to apply a force in the opposite direction and press the refill valves 9, 12 onto their sealing seat 14, 15.

The drawings also show connecting lines VL, which lead to wheel brake cylinders RZ.

Further details of the suction refill valve are illustrated by the enlarged cross section shown in FIG. 2. The refill valve shown in FIG. 2 corresponds to the refill valve disposed in the floating brake piston 7. The refill valve located in the brake piston 6, however, is embodied in the same way.

The refill valve 12 is shown in the closed position in FIG. 2, so that it is pressed upon the sealing seat 15 by the spring 13.

The refill valve 12 has a sealing element 16, which is embodied by an elastic, annular molded element including an axial passage or opening 26 through which fluid flows. Rubber, for example, may be used as the material for the sealing element 16. The sealing element 16 has a tubular extension 17, the face end of which forms an annular sealing face 18. In the position shown, the sealing face 18 seats upon sealing seat 15 which closes the valve opening 19, which is embodied by an annular gap 20 which surrounds one end of a pin 28 which is provided with recesses as shown in FIG. 3.

On the side of the sealing element 16 remote from the sealing face 18, this element rests on the valve body 21, which is resiliently supported on a valve stem. The sealing element is secured on the valve body 21 by means of a cap 23, which includes four equally spaced tabs 23a on an open end which are pressed inwardly and engages an annular groove 24 in the valve body 21 and includes a central portion that overlaps the sealing element 16.

The cap 23 also includes a reduced diameter end portion that surrounds the tubular extension 17 of the sealing element 16. The valve stem 22 is pressed into the valve 12 and held therein.

On the end of the sealing element 16 resting on the valve body 21, recesses 25, which connect the annular opening 26 with the space of the bore 27, are provided in the sealing element 16. The recesses 25 are adjacent the valve body 21 and form with the valve body flow Ser. No. 182,011 passages through which fluid flows from the axial passage or opening 26 to the bore 27 in which the refill valve 12 is secured.

The annular gap 20 is formed by the outer circumference of a pin 28 and by the inner wall of a stepped bore 29. The pin 28 is pressed into a smaller diameter bore in the brake piston 7 than portion of the stepped bore 29. Via recesses 30 the stepped bore 29. Via recesses 30 in the pin 28, brake fluid can flow out of the transverse bore 31 to enter the annular gap 20. The section A-B through the pin 28 is shown in FIG. 3 to illustrate the recesses 30.

FIG. 4 shows the section C-D through the refill valve 12. Here, guide lugs 32 are visible in particular, resting on the cylindrical wall of the bore 27.

The bore 27 is part of the work chamber 33 associated with the brake piston 7, so that the refill valve is surrounded by the pressure prevailing in the work chamber 33.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A suction refill valve for a master brake cylinder, which comprises a bore (27), an inlet which opens into said bore, a valve seat on said inlet, a valve body (21) in said bore, a sealing element (16) attached to said valve body relative to said valve seat, said valve body is operative in said bore to move said sealing element relative to said valve seat for opening and closing said inlet, said sealing element (16) is an annular molded element and includes an axial passage (26) for fluid flow and a sealing face (18), such that when said inlet is closed by said sealing face of said sealing element, said sealing element is acted upon on all sides sealing element, said sealing element is acted upon on all sides, except on its sealing face (18), by a pressure prevailing in said bore.

2. A refill valve as defined by claim 1, which includes recesses (25) on an end of the sealing element (16) opposite from the sealing face (18) relative to said valve body, said recesses (25) connect said axial passage (26) in said sealing element (16) with said bore (27).

3. A refill valve as defined by claim 1, in which a cap (23) encompasses said sealing element (16), said cap engages an annular groove (24) on said valve body (21), and said sealing element (16) includes a tubular extension (17) of reduced outside diameter which protrudes through a suitable opening in said cap (23) and an end face of said tubular extension forms said sealing face (18).

4. A refill valve as defined by claim 2, in which a cap (23) encompasses said sealing element (16), said cap engages an annular groove (24) on said valve body (21), and said sealing element (16) includes a tubular extension (17) of reduced outside diameter which protrudes through a suitable opening in said cap (23) and an end face of said tubular extension forms said sealing face (18).

5. A refill valve as defined by claim 3, in which said valve body (21) is resiliently disposed and guided in said bore (27) by means of guide lugs (32) formed on said cap (23).

6. A refill valve as defined by claim 4, in which said valve body (21) is resiliently disposed and guided in said bore (27) by means of guide lugs (32) formed on said cap (23).

7. A refill valve as defined by claim 6, which includes a valve opening (19) embodied as an annular gap (20).

8. A refill valve as defined by claim 4, in which said inlet includes a valve opening (19) embodied as an annular gap (20).

9. A refill valve as defined by claim 2, in which said inlet includes a valve opening (19) embodied as an annular gap (20).

10. A refill valve as defined by claim 5, in which said inlet includes a valve opening (19) embodied as an annular gap (20).

11. A refill valve as defined by claim 3, in which said inlet includes a valve opening (19) embodied as an annular gap (20).

12. A refill valve as claimed in claim 1, which includes two similar axially aligned valve bodies and two separate bones.

13. A refill valve as defined by claim 2, which includes a valve opening (19) embodied as an annular gap (20).

14. A suction refill valve for a master brake cylinder, which comprises a bore (27), a valve body in said bore, an inlet opening into said bore, a valve seat on said inlet opening, said opening includes a valve opening (19) embodied as an annular gap (20) formed by an outer circumference of an end of a pin (28) fixed in said inlet opening and an inner wall of a stepped bore, a sealing element attached to said valve body relative to said valve seat and an end face of said end of said pin (28) being flush with said valve seat, said valve body is operative in said bore relative to said valve seat on said end face of said pin (28), said sealing element (16) is an annular molded element with an open axial opening (26) such that, when said inlet opening is closed by said sealing element, said sealing element is acted upon on all sides, except on its sealing face (18), by a pressure prevailing in said bore.

* * * * *